United States Patent [19]

Eseifan

[11] 4,436,822

[45] Mar. 13, 1984

[54] REAGENT MIXING SYSTEM AND METHOD

[75] Inventor: Ali H. Eseifan, San Franciso, Calif.

[73] Assignee: Sherwood Medical Company, St. Louis, Mo.

[21] Appl. No.: 304,453

[22] Filed: Sep. 22, 1981

[51] Int. Cl.[3] ........................ G01N 31/00; G01N 1/14; G01N 21/24

[52] U.S. Cl. ...................................... 436/164; 422/63; 422/64; 422/100; 436/174; 436/180; 436/54

[58] Field of Search ................. 436/164, 54, 174, 180; 422/63, 64, 100

[56] References Cited

U.S. PATENT DOCUMENTS 4,276,048 6/1981 Leaback .............................. 436/180

4,311,667 1/1982 Gocho .................................. 422/64

4,351,799 9/1982 Gross et al. ........................... 422/63

*Primary Examiner*—Ferris H. Lander

*Attorney, Agent, or Firm*—Stanley N. Garber; Gregory E. Upchurch; William R. O'Meara

[57] ABSTRACT

A mixing system and method for analyzing a specimen is provided which includes introducing a predetermined number of discrete jets of liquid reagent into a container carrying a specimen. The jets of reagent cause turbulent mixing of the reagent and specimen. The jets are time-spaced to allow settling of the mixture between jets to prevent the escape of the mixture from the container. After the reagent and specimen are thoroughly mixed, a characteristic of the mixture is then detected.

16 Claims, 8 Drawing Figures

REAGENT MIXING SYSTEM AND METHOD

DESCRIPTION

1. Technical Field

This invention relates to reagent mixing systems and more particularly to a reagent mixing system for a specimen analyzing device.

2. Background Art

In certain medical analyzing devices, detection systems are employed in which a reagent is mixed with a specimen and a change in characteristic, such as electrical conductivity, optical density or absorbance, concentration, rate of chemical reaction, or other characteristics, is detected. Some analyzing devices may be used to determine, for example, prothrombin time, creatinine concentration and so forth.

In order to obtain consistent, accurate testing results, the reagent must be thoroughly mixed with each sample to be tested. This mixing has been accomplished, for example, by employing shaking, stirring or blending devices, or ultrasonic mixing, rotating, and inverting apparatus. Such mixing methods and devices require considerable energy and space, and generally result in relatively large and expensive analyzing equipment. For example, in U.S. Pat. No. 3,754,866 an optical detecting system is shown in which magnetic stirring apparatus is used to effect mixing of a reagent with the sample. In that patent, a motor driven magnet spaced from the bottom of the sample container is employed to rotate a magnetic mixing element disposed within the sample. Further means are provided to stop the motion of the magnetic element and stirring effect during operation of the system. Such a system adds to the overall size and increases the cost and complexity of the apparatus and requires considerable energy.

DISCLOSURE OF THE INVENTION

It is therefore an object of the present invention to provide an improved mixing system and method for use in an analyzing system which overcomes one or more of the above mentioned problems. In accordance with one aspect of the present invention, a mixing system and method are provided which include introducing a plurality of jets of reagent liquid into a container carrying a specimen to effect turbulent mixing of the reagent and the specimen in the container. The jets of reagent liquid are timed to allow the mixture to become less turbulent between jets.

These, as well as other objects and advantages of the present invention, will become more apparent from the following detailed description and accompanying drawing.

DETAILED DESCRIPTION OF THE PREFERRED EMBODIMENT

Figure 1:
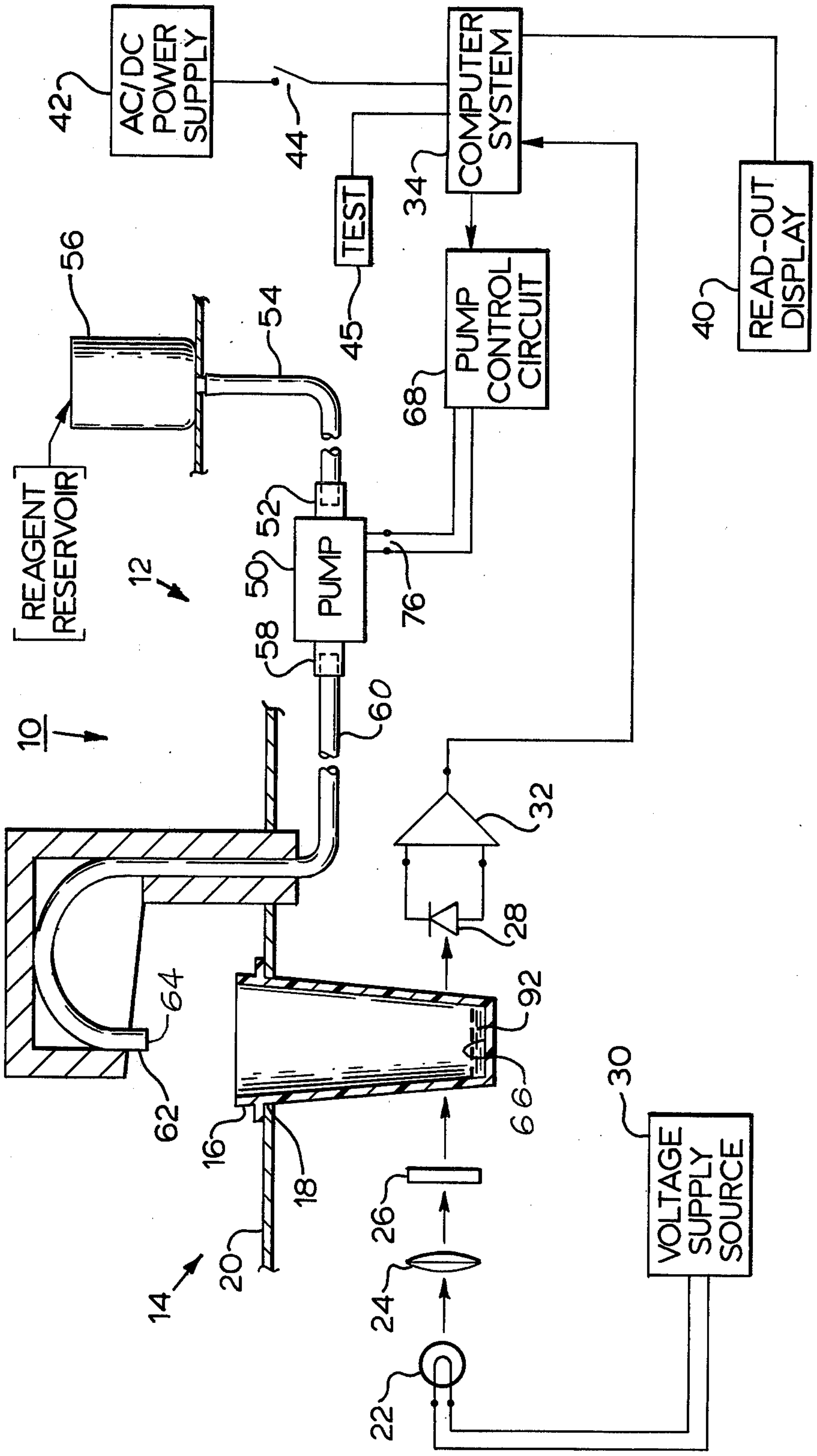
FIG. 1 is a schematic diagram of an analyzing system which includes a reagent mixing system in accordance with a preferred embodiment of the present invention.

Referring now to the drawings and more particularly to FIG. 1, a specimen analyzing system 10 is shown including a reagent mixing system 12 in accordance with the present invention. While the mixing system 12 may be used in various types of specimen analyzing systems, for example, of the type that detect electrical or chemical characteristics of a sample and reagent, a mixing system of the present invention is particularly useful in specimen analyzing systems which detect optical characteristics such as transmittance, concentration, light absorbance, rate of change of light absorbance, and others. The detecting of such optical characteristics are useful in medical testing, for example, in the determination of clotting time of blood plasma, concentration of creatinine, and in many other medical determinations.

The analyzing system 10 is shown including an optical detecting system or spectrophotometer diagramatically shown at 14. The optical detection system 14 is shown including a specimen container or cuvette 16 positioned in a well 18 of a plate 20 of a housing for the apparatus. A light source 22, preferably a high intensity lamp, for example, a halogen lamp, is mounted to the housing plate 20 to pass a light beam through a focusing lense 24 and a filter 26 mounted in the housing on one side of cuvette 16. The filter is chosen to allow the passage of light at wavelengths which are in accordance with the characteristic of the specimen to be analyzed. Light passing through the cuvette 16 from lamp 22 is received by a light detector or light transducer 28 mounted in the housing on the opposite side of the cuvette. The detector 28 produces an electrical signal output proportional to the transmittance of the specimen in the cuvette 16. The lamp 22 is enegized by a voltage supply source 30. The detector 28 has its output connected to a conventional signal amplifier 32 having its output connected, for example, to a suitable or conventional programmed computer system 34. The computer system 34 is shown connected to a read-out display device 40. The computer system 34 is shown energized by a power supply indicated at 42 through an on-off switch 44. A "test" switch for manually starting the programmed operations of the computer system to effect a test on the sample in the cuvette is indicated at 45.

Depending upon the particular test desired, the computer 34 may be programmed to provide a read-out at device 40 that is related to optical density or a change in light absorbance or other optical characteristic of the desired or particular solution of reagent and specimen under consideration. For example, the detection of a rate of change in transmittance by detector 28 can be used to calculate a change in absorbance and be used by the computer to determine, for example, the concentration of creatinine in a sample of urine. The reagent used in such case may be picrate (picric acid and an alkaline solution).

Mixing system 12 is shown including a liquid pump 50 having an inlet 52 connected by a conduit 54 to a source or reservoir 56 of liquid reagent. Pump 50 has an outlet 58 shown connected by a conduit 60, such as a flexible conduit, to a nozzle 62 having an outlet 64 positioned directly above the geometric center of the inner bottom wall 66 of cuvette 16. The operation of the pump 50 is controlled by a pump driver or control circuit indicated at 68 which, in the illustrated embodiment, is controlled by the computer system 34.

Figure 2:
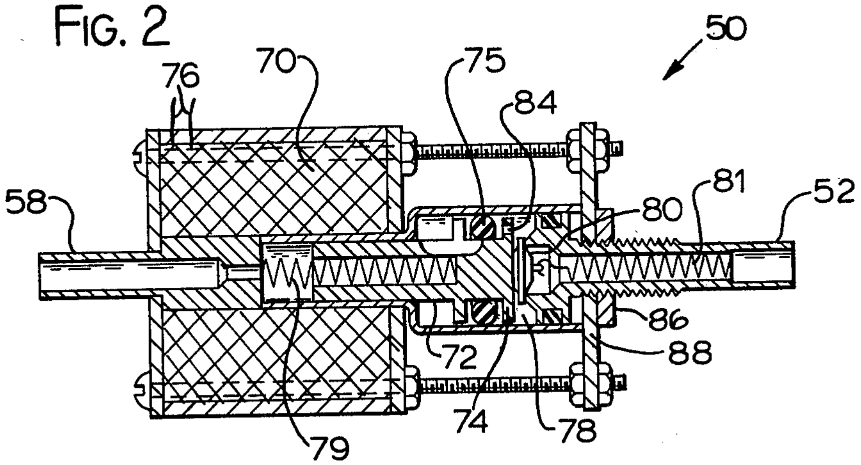
FIG. 2 is a cross sectional view of the liquid pump of FIG. 1.

Pump 50 may be of any suitable or conventional type that is capable of being controlled in a manner to produce a plurality of pressure pulses or jets of liquid at its outlet 58. Pump 50, as shown in greater detail in FIG. 2, is illustrated as a solenoid actuated, positive displacement pump. The pump includes a solenoid coil 70 surrounding a slidable magnetic piston rod 72 having a piston with an annular seal 75. Solenoid coil 70 has a pair of leads 76 shown connected in FIG. 1 to the pump control circuit 68. Piston 74 is sealingly slidable in a fluid chamber 78 and is spring biased toward the right or inlet of the pump by a spring 79. At the inlet 52, a check valve 80 is spring biased to the closed position by a spring 81.

When the solenoid coil 70 is energized by a signal from pump control circuit 68, the piston rod 72 and piston 74 are rapidly moved leftwardly to pressurize liquid in chamber 78 on the outlet or left side of piston 74 to effect a jet or pressurized stream of reagent liquid through the outlet 58 to nozzle 62 and into the cuvette 16. During this liquid displacement movement of piston 74, fluid pressure differential effects cause check valve 80 to open and the flow of liquid reagent from reservoir 56 into inlet 52 and into chamber 78 on the inlet or right side of piston 74. At the end of the actuating signal, spring 79 returns the piston 74 rightwardly toward its stop or into engagement with the valve 80. During this return movement of piston 74 reagent liquid in chamber 78 flows from the rightward side of piston 74 through opening(s) 84 in the piston wall and into the chamber portion on the outlet or left side of the piston. In the pump shown, the sealing ring 75 is axially movable to close opening 84 on the pressure generating stroke of the piston and to open the opening 84 on the retractile or rightward return stroke of the piston. The volume or quantity of liquid discharged through the outlet 58 on each positive displacement stroke of the piston 74 is determined by the length of the piston stroke, and this can be adjusted by loosening a lock nut 86 and rotating the inlet 52 which is shown threaded to the pump housing end plate indicated at 88. Since the piston engages the valve 80, the adjustment of the inlet 52 determines the stroke length.

Figure 3:
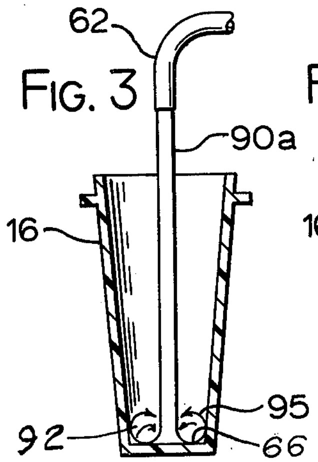
FIGS. 3 through 8 are schematic illustrations showing operations performed by the analyzing system of FIG. 1.
Figure 4:
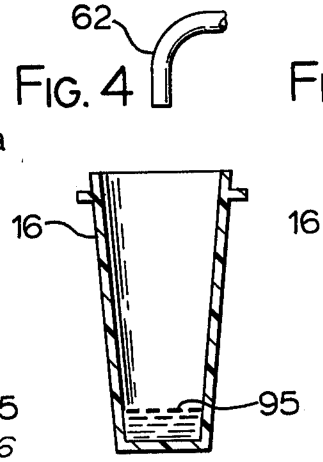
Figure 5:
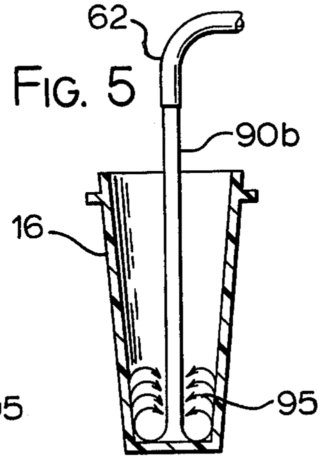
Figure 6:
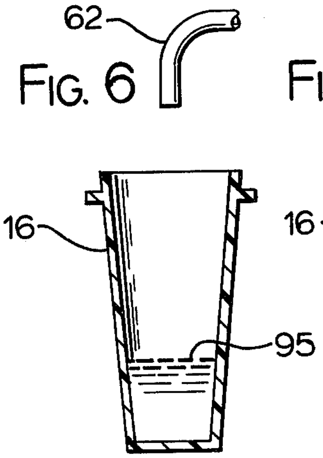
Figure 7:
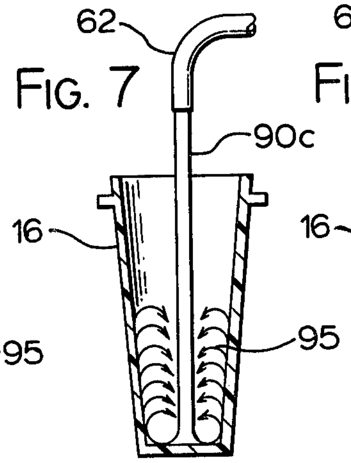
Figure 8:
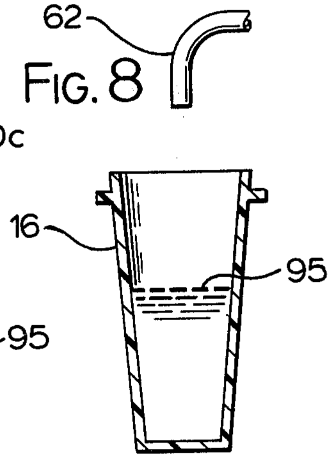

A series of successive steps or functions performed by the analyzer 10 in the mixing of the liquid reagent, indicated by the numerals 90 *a–c,* with a sample or specimen, indicated at 92 in FIG. 1, are illustrated in FIGS. 3 through 8. In FIG. 3, a first pressure surge or jet 90*a* of liquid reagent is shown being discharged from nozzle 62 and striking the upper surface of the sample 92 above the geometric center of the bottom wall 66 of cuvette 16. This jet of reagent is caused by a control pulse or signal voltage applied to solenoid coil 70 from pump control circuit 68. This jet 90*a* of liquid reagent causes turbulent mixing of the reagent and the sample 92 (FIG. 1) to form a mixture or solution indicated at 95 (FIG. 3). The turbulence caused by the jet is indicated by arrows. At the end of the applied signal, coil 70 is deenergized so that the flow of reagent from the nozzle 62 is stopped and for a predetermined length of time before the next jet. The mixture 95 of the reagent and specimen in cuvette 16 is allowed to substantially settle and become calm or less turbulent as shown in FIG. 4. After a predetermined time, a second pulse is applied to energize coil 70 to cause a second jet of liquid 90*b,* FIG. 5, to rush into the cuvette 16 so that this jet mixes with the sample and reagent solution 95 in the cuvette by causing liquid turbulence as indicated. Upon cessation of the second energizing signal applied by the control circuit 68, the coil 70 is deenergized and the liquid reagent stops flowing from the nozzle 62 for a predetermined time to permit the mixture 95 in cuvette 16 to settle or become less turbulent, as shown in FIG. 6. A signal is again applied by source 68 to the solenoid coil 70 to cause a third jet of liquid reagent 90*c,* FIG. 7, to be introduced into the liquid mixture 95 now in cuvette 16 to provide further turbulent mixing of the reagent and sample as shown in FIG. 7. After jet 90*c,* the liquid turbulence is reduced as seen in FIG. 8. In FIGS. 3, 5 and 7, for example, the arrows are shown headed downwardly into the center of the cup with the liquid flowing upwardly along the sides during each jet. This application of a jet of liquid and a time to settle before the next successive jet, is preferably performed by introducing at least two discrete jets and preferrably five discrete jets of liquid reagent into a cup containing the sample (only three jets and two periods of settling time between successive jets are illustrated in FIGS. 3 through 8).

After the last jet and preferably after a settling time, the computer circuit 34 stores a signal generated by detector 28 which is responsive to the light passing through the thoroughly mixed reagent and sample liquid, and cuvette 16. The detector signal is proportional to the transmittance of the liquid mixture in cuvette 16. Amplifier 32 amplifies this signal and applies it to the computer system for analysis and read-out at 40. The computer, of course, may be programmed to operate the light and pickup signals from amplifier 32 in a manner to produce various read-out data corresponding to various characteristics of the sample under consideration. For example, the computer may store and compare two time-spaced signals from detector 28 for the same specimen to provide an indication of a rate of change in absorbance.

The accuracy of a test result is affected by the amount of reagent used for a given quantity of specimen so that the amount of reagent used should be an accurate quantity. Thus, the pump 50 is chosen and adjusted to provide a predetermined total amount of reagent in the container after the desired predetermined number of jets of reagent have been introduced into the container. Preferably, each introduces a similar amount of reagent, that is, an equal portion of the predetermined total amount required.

Each jet of reagent should produce sufficient turbulence of the liquid within the container that turbulent or good mixing is obtained but the reagent should not, of course, be jetted with such force as to produce a liquid turbulence that causes liquid to escape from the container. In this regard, the time between jets should be long enough to allow the liquid turbulence to become so reduced in magnitude, that the next successive jet will not cause liquid to flow out of the container. Preferably each jet produces a pressure of one or more psi against the upper surface of the liquid in the container.

In one case it has been found that about a six psi pressure jet with a settle time between successive jets of 300 milliseconds has provided good results. Thus, the settle time between jets can be substantially less than one second. The number of jets should be at least two, as previously mentioned, so that the first jet is mixed with the specimen and the second jet causes a thorough mixing. More than two jets are preferred. In one case, good results were obtained when five such successive jets have been employed, each introducing 100 microliters of a picrate reagent into a urine specimen of 50 microliters in a container having a capacity of 1.5 milliliters and an inner flat bottom wall diameter of 8 millimeters.

Each jet preferably enters the liquid in the cuvette and penetrates the liquid more than one-half the depth of the liquid, and more preferably, has such force that the jet strikes the bottom of the cuvette wall 66, as shown in FIGS. 3, 5 and 7. This ensures thorough mixing. Preferably more than one jet engages the bottom wall 66 of the cuvette, although it is not necessary that all jets strike the bottom wall.

While the total amount of reagent used is generally greater than the total amount of specimen, each discrete jet of reagent, may contain less than the total amount of the specimen. Also, the settling time between jets, that is, the time between the end of one jet and the beginning of the next jet, is preferably at least 100 milliseconds. In addition, the specimen may be offset from the center of the cuvette so that the first jet strikes the center of the cuvette itself rather than the specimen.

While employing a computer type control, the pump may be operated by any suitable pulse timer or even manually. For example, the solenoid coil 70 may be connected with a manually operated switch to a suitable supply source and the solenoid coil manually turned on and off to produce the desired number of jets.

Thus, the pump 50 not only serves to supply the reagent but also effects thorough mixing of the reagent and specimen. By employing a series of jets to effect mixing of reagent and specimen, relatively expensive reagent mixing devices previously mentioned can be avoided, as well as the energy and space requirements for them. Also, portable specimen analyzing devices can be made relatively economically as well as economically used. For example, because the energy otherwise required by some prior art mixing devices is not required, battery operated portable analyzing devices can be economically produced.

As various changes could be made in the above construction without departing from the scope of the invention, it is intended that all matter contained in the above description and apparatus showing the accompanying drawing shall be interpreted as illustrative and not in a limiting sense.

I claim:

1. A method of introducing and mixing a predetermined amount of a liquid reagent with a predetermined amount of a sample in a process of analyzing a characteristic of the sample comprising the steps of successively introducing through nozzle means a plurality of discrete jets of a liquid reagent into a container holding a sample while the nozzle means is spaced from the container and with sufficient force to effect turbulent mixing of the reagent and specimen with each jet, predeterminately time spacing the jets so that the turbulent mixing caused by one jet is reduced in magnitude before the next jet is introduced, the plurality of the jets providing said predetermined amount of the liquid reagent, and after the last jet has been introduced into the container detecting a characteristic of the container contents.

2. The method of claim 1 wherein each of said jets introduces a like quantity of reagent into the container.

3. The method of claim 1 wherein more than one of said jets engage the bottom wall of said container.

4. The method of claim 1 or 2 wherein said detecting step includes passing light through the container and container contents, and detecting a signal proportional to the intensity of light passing through the container and container contents.

5. The method of claim 1 or 2 wherein said plurality of jets is greater than two.

6. The method of claim 5 wherein the time between jets is less than one second.

7. The method of claim 6 wherein the time between successive jets is greater than 100 milliseconds.

8. The method of claim 5 wherein said plurality of jets is five.

9. The method of claim 5 wherein each of the jets subsequent to the first jet effects a pressure of more than one pound per square inch on the surface of the liquid in the container.

10. A method of mixing a predetermined amount of a liquid specimen with a predetermined amount of a liquid reagent in a container and thereafter detecting a characteristic of the specimen for medical analysis comprising the steps of introducing a liquid specimen of predetermined quantity into a container, then successively introducing through nozzle means at least two discrete jets of a liquid reagent of the same kind into the container with the specimen while the nozzle means is spaced from the container and is above the upper surface of the liquid in the container and with sufficient force to effect turbulent mixing of the reagent and specimen with each jet, predeterminately time spacing the jets so that the turbulent mixing caused by one jet is reduced in magnitude before the next successive jet is introduced into the container, said jets providing said predetermined amount of said liquid reagent, and after the last jet has been introduced into the container detecting a characteristic of the mixed liquid while in the container.

11. The method of claim 10 wherein said detecting step includes passing light through the container and mixed liquid therein, and detecting a signal proportional to the intensity of light passing through the container and mixed liquid therein for analyzing a characteristic of the mixed liquid.

12. The method of claim 10 or 11 wherein said nozzle means includes a nozzle positioned so that each jet therefrom is directed substantially at the geometric center of the bottom of the container and with the nozzle stationary with respect to the container during and between the jets.

13. The method of claim 12 wherein the nozzle effects only a single stream during each jet of liquid reagent and each jet subsequent to the first jet initially strikes the liquid contents in the container, and wherein the nozzle is above the liquid in the container.

14. The method of claim 10 or 11 wherein each of said jets penetrates the liquid in the container more than one-half of the depth of that liquid.

15. The method of claim 10 or 11 wherein at least some of the jets penetrate the full depth of the liquid in the container.

16. The method of claim 10 wherein the nozzle means is spaced above the upper surface of the container.

* * * * *